United States Patent [19]
Carroll et al.

[11] 3,968,000
[45] July 6, 1976

[54] METHOD FOR MAKING PIPE END PLUGS

[75] Inventors: James C. Carroll, Bartlesville, Okla.; Clel H. Shafer, Perryton, Tex.

[73] Assignee: Phillips Petroleum Company, Bartlesville, Okla.

[22] Filed: Apr. 7, 1975

[21] Appl. No.: 565,871

[52] U.S. Cl. .................... 156/258; 138/89; 138/106; 219/61; 219/104; 219/107; 220/67; 220/71; 228/171
[51] Int. Cl.² ............... B32B 31/00; F16L 55/10; B23K 9/02; B65D 7/42
[58] Field of Search ............. 156/211, 256, 258; 228/171, 164, 169; 219/61, 107, 104; 138/89, 96 R, 109; 220/66, 67, 71

[56] References Cited
UNITED STATES PATENTS
2,273,601  2/1942  Thomas ..................... 220/71

Primary Examiner—Douglas J. Drummond

[57] ABSTRACT

An end plug is formed by heat-sealing or welding a V-shaped section cut from the wall of a first pipe to a complementary shaped butt end of a second pipe.

7 Claims, 4 Drawing Figures

U.S. Patent   July 6, 1976   3,968,000

METHOD FOR MAKING PIPE END PLUGS

This invention relates to the production of an end plug for a pipe.

During the fabrication of a system of piping it is sometimes necessary to close the end of a pipe by means of a plug. Flat end plugs, formed by welding or fusing a flat plate to the end of a section of pipe, are not completely satisfactory since such plugs have lower strength than the pipe itself. In the case of thermoplastic pipe, conventional threaded plugs and adhesives have been found unsatisfactory due in part to cold flow and notch sensitivity characteristics of many thermoplastic materials used in piping. There is a need, therefore, for an end plug having a strength at least equal to that of the parent pipe.

Accordingly, it is an object of this invention to provide an improved method for forming a pipe end plug.

Figure 1:
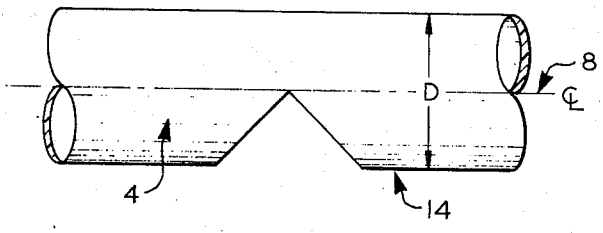
Figure 1:
Figure 2:
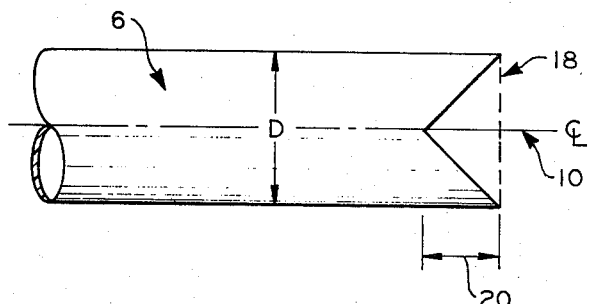
Figure 3:
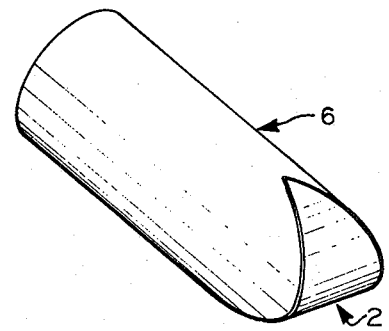
Figure 4:
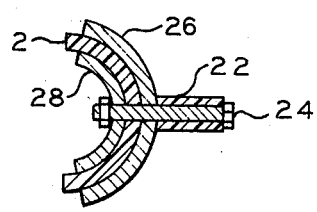

Other objects, advantages and features of this invention will be readily apparent to those skilled in the art from the following disclosure, appended claims and drawing, of which:

FIGS. 1–3 are views illustrating the various stages during the formation of an end cap on a pipe in accordance with the present invention and FIG. 4 is a view of a jig for holding the end plug section during fabrication.

By the present invention, there is provided a method for forming an end cap on a pipe which comprises removing a V-shaped section of pipe wall from a first pipe having an outer diameter D, removing a portion of the butt end of a second pipe having an outer diameter substantially equal to D, so as to form the end into a complementary shape to that of the V-shaped section of pipe wall from the first pipe, and fusing together the V-shaped section and the shaped butt end so as to As shown in FIG. 1, a V-shaped section 2 is removed from a first pipe 4 having an outer diameter D.

As shown in FIG. 2, the butt end of a second pipe 6 of diameter D is cut so as to form the end into a complementary shape to that of the V-shaped section 2 of pipe wall from the first pipe 4.

The V-shaped section 2 is then fused to the complementary shaped end of pipe 6, thus forming an end plug as shown in FIG. 3.

When the longitudinal axes 8 and 10 of the first pipe 4 and the second pipe 6, respectively, are aligned in a substantially common plane, the projections of the V-shaped section 2 and the complementary shaped butt end of pipe 6 onto the common plane define triangles. The base 12 of the first triangle defined by the projection of the V-shaped section 2 conforms to the axial side 14 of pipe 4, which base has a length approximately equal to the outer diameter D of the pipe 4. The first triangle has a height 16 approximately equal to ½D. The base of the second triangle defined by the projection of the removed portion of the butt end of pipe 6 conforms to the plane 18 vertical to the longitudinal axis 10 of pipe 6 and the height 20 of the second triangle conforms to the longitudinal axis of pipe 6.

In a presently preferred embodiment, the first and second pipes have the same inner diameter.

As used herein, the term "pipe" is intended to include metal and thermoplastic materials. The term "fuse" is intended to include heat-sealing and welding, as well as any other type bonding whereby there is formed an impermeable seal along the joint line.

In a presently preferred embodiment of this invention the pipe is formed from a thermoplastic material.

The method of this invention is applicable to pipes formed from thermoplastic homopolymers and copolymers of mono-1-olefins having from 2 to 8 carbon atoms per molecule. Examples of suitable thermoplastic materials include polyethylene, polypropylene, copolymers of ethylene and propylene, copolymers of ethylene and 1-hexene and copolymers of ethylene and 1-butene. In a presently preferred embodiment, a copolymer of ethylene and 1-butene is used.

In preparing an end cap on a thermoplastic pipe, the V-shaped section 2 and the complementary shaped butt end of pipe 6 are fused together by heating the V-shaped section in the region of the face of the pipe wall to heat-sealing temperature, heating to heat-sealing temperature the shaped butt end in the region of the face of the pipe wall, pressing together the V-shaped section and the complementary shaped butt end and reducing the temperature of the heated region to below heat-sealing temperature.

The temperature required for heat-sealing the V-shaped section and the shaped butt end is within the range of 200°–500°F. The joining pressure is within the range of 1 to 100 psi. The joining time is sufficient to allow the heated regions to cool below the heat-sealing temperature.

The welding or joining of metal pipe is in accordance with conventional pipe welding or joining procedures.

The method of this invention is generally applicable to any size of pipe. This method is particularly suitable for large diameter pipes, i.e., pipe having an outer diameter in the range of 6 to 36 inches, or greater.

In some instances it may be desirable to mill and/or bevel the joining faces of the V-shaped section 2 and the shaped butt end of the second pipe 6, in order to increase the mating surface areas and/or to correct cutting errors.

In machining and welding the V-shaped sections, it may be necessary to hold the plug section rigidly in a fixed position. This can be accomplished by cutting a hole from the plug section 2 to allow passage of a screwbolt therethrough to accommodate metal jigs 26 and 28 and stub end pipe 22, which provide a firm support for the plug section 2 (FIG. 4). Jigs 26 and 28 have a shape complementary to the shape of the plug section 2. Jig 26 has an I.D. approximately equal to the O.D. of the plug section 2; jig 28 has an O.D. approximately equal to the I.D. of the plug section 2. The stub end pipe 22 can, if desired, be affixed in an appropriate manner to the exterior surface of the jig 26. The assembly can then be mounted in an appropriate support.

After the weld has been made, the pipe 22, screw bolt 24 and jigs 26 and 28 are removed and the hole filled in by fusing a plug of the same material into the hole. It has been found that such a procedure will not weaken the end plug assembly.

When a plug fabricated from normally 6 in. ID pipe (5⅝ actual ID) having a wall thickness of ⅝ inches, using this method including the pipe for mounting support, was tested by ASTM Method D-1599-69, bursting occurred at 715 lbs/sq. in., which is also the bursting strength of the original pipe. The resin used to make this pipe was a copolymer of ethylene and 1-butene containing from 3 to 5 weight percent 1-butene, having a density of 0.955 (ASTM D-1505-67) and a melt flow of 1.5 g/10 minutes (ASTM D-1238-65T, Cond. F).

Reasonable variations and modifications, which will be apparent to those skilled in the art, can be made in this invention without departing from the spirit and scope thereof.

What is claimed is:

1. A method for the production of an end plug for a thermoplastic pipe which comprises the steps of
   a. removing a V-shaped section of pipe wall from a first pipe having an outer diameter D;
   b. removing a portion of the butt end of a second pipe having an outer diameter D, so as to form the end into a complementary shape to that of said V-shaped section of said first pipe;
   c. cutting a hole from said V-shaped section of said first pipe to allow passage of a bolt therethrough to accommodate a complementary shaped inner jig having an outer diameter approximately equal to the inner diameter of said first pipe, and a complementary shaped outer jig having an inner diameter approximately equal to said outer diameter D;
   d. affixing said inner jig and said outer jig with said bolt to said V-shaped section;
   e. heating to heat-sealing temperature said V-shaped section in the region of the face of the pipe wall;
   f. heating to heat-sealing temperature said butt end in the region of the face of the pipe wall of the complementary shape;
   g. pressing together said V-shaped section and said complementary shaped butt end so as to form an end plug;
   h. reducing the temperature of the heated region to below heat-sealing temperature;
   i. removing said jigs and said bolt; and
   j. filling in said hole in said V-shaped section by fusing a plug of the same thermoplastic into said hole.

2. The method of claim 1 wherein said V-shaped section has a depth approximately equal to ½D and a base approximately equal to D.

3. The method of claim 1 wherein said pipe is a thermoplastic pipe formed of a material selected from the group consisting of homopolymers and copolymers of mono-1-olefins having from 2 to 8 carbon atoms per molecule.

4. The method of claim 1 wherein said first pipe and said second pipe have substantially the same inner diameter $d$.

5. The method of claim 1 wherein said V-shaped section and said shaped butt end are heated within a temperature range of about 200°–500°F for a time sufficient to bring the wall faces thereof to heat-sealing temperature.

6. The method of claim 1 wherein said V-shaped section and said shaped butt end are pressed together with a pressure in the range of 1 to 100 psi.

7. The method of claim 3 wherein said thermoplastic pipe is formed of a copolymer of ethylene and 1-butene.

* * * * *